(12) United States Patent
Autunez

(10) Patent No.: US 6,659,125 B1
(45) Date of Patent: Dec. 9, 2003

(54) HEIGHT-ADJUSTABLE TANK VALVE

(76) Inventor: Bruce A. Autunez, 1143 Indian Springs, Glendora, CA (US) 91740

( * ) Notice: Subject to any disclaimer, the term of this patent is extended or adjusted under 35 U.S.C. 154(b) by 0 days.

(21) Appl. No.: 10/209,182

(22) Filed: Jul. 30, 2002

(51) Int. Cl.[7] .......................... F16K 31/18; F16K 31/34
(52) U.S. Cl. ....................... 137/426; 137/436; 137/444; 137/414
(58) Field of Search ................... 137/414, 426, 137/435, 436, 437, 441, 442, 443, 444

(56) References Cited

U.S. PATENT DOCUMENTS

| | | | | |
|---|---|---|---|---|
| 3,930,516 A | * | 1/1976 | Flinner et al. | 137/436 |
| 4,182,364 A | * | 1/1980 | Gilbert et al. | 137/426 |
| 4,600,031 A | * | 7/1986 | Nestich | 137/436 |
| 4,646,779 A | * | 3/1987 | Johnson | 137/426 |
| 4,765,363 A | * | 8/1988 | Pi-Yu | 137/437 |
| 4,945,944 A | * | 8/1990 | Chen | 137/426 |
| 5,035,257 A | * | 7/1991 | Antunez | 137/426 |
| 5,255,703 A | * | 10/1993 | Johnson | 137/426 |
| 5,715,859 A | * | 2/1998 | Nichols-Roy | 137/426 |
| 5,904,176 A | * | 5/1999 | Li | 137/426 |
| 5,964,247 A | * | 10/1999 | Johnson | 137/426 |
| 6,047,725 A | * | 4/2000 | Gish et al. | 137/426 |
| 6,199,581 B1 | * | 3/2001 | Gil | 137/426 |
| 6,244,292 B1 | * | 6/2001 | Antunez | 137/436 |
| 6,260,574 B1 | * | 7/2001 | Nichols-Roy | 137/436 |

* cited by examiner

Primary Examiner—George L. Walton
(74) Attorney, Agent, or Firm—Donald D. Mon

(57) ABSTRACT

A toilet tank valve having valve workings supported on a riser. The riser incorporates a serpentine ladder-like groove pattern engaged by a tooth, such that the height of the valve workings can be adjusted by a ladder-like relative movements of an inner and outer tube.

11 Claims, 3 Drawing Sheets

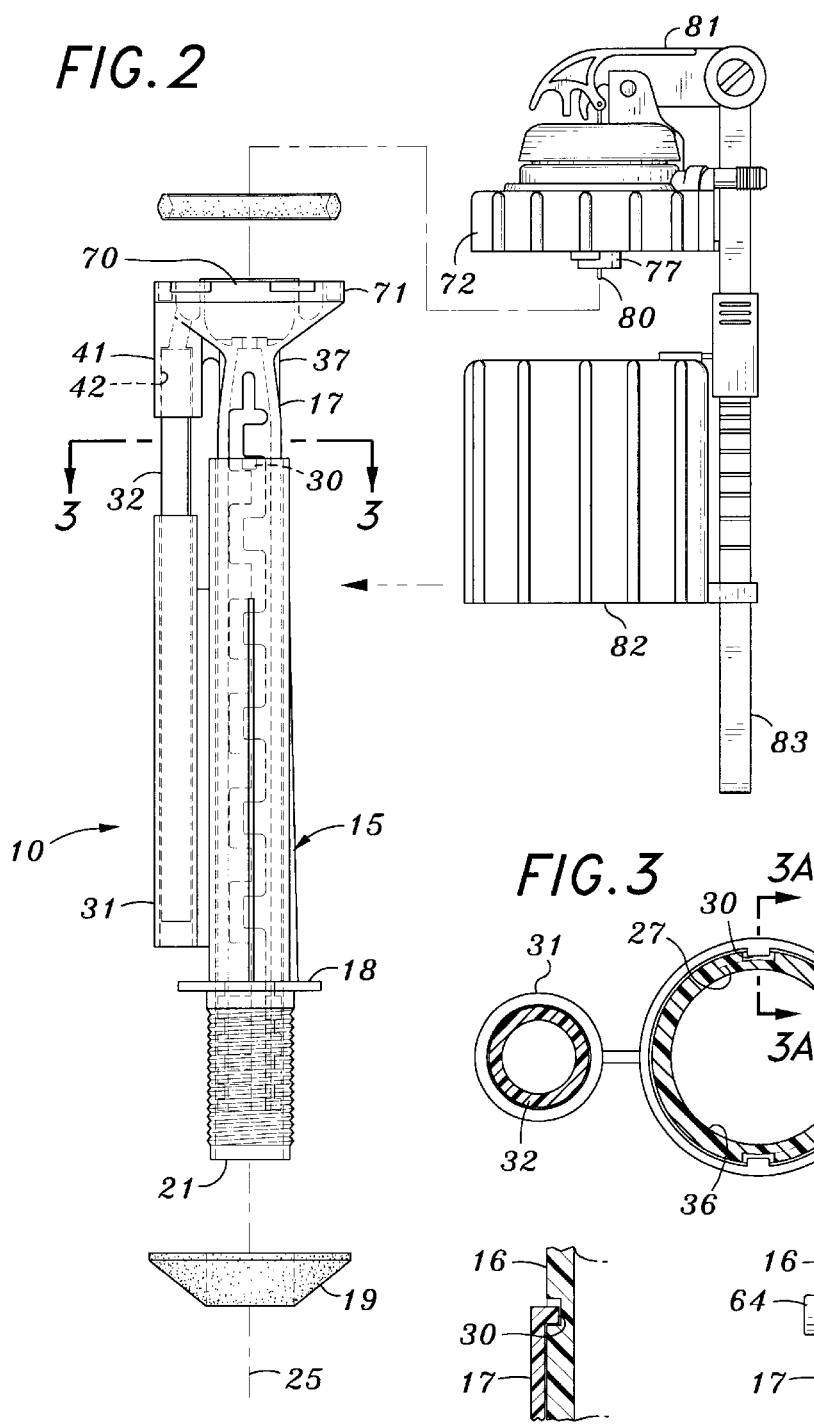

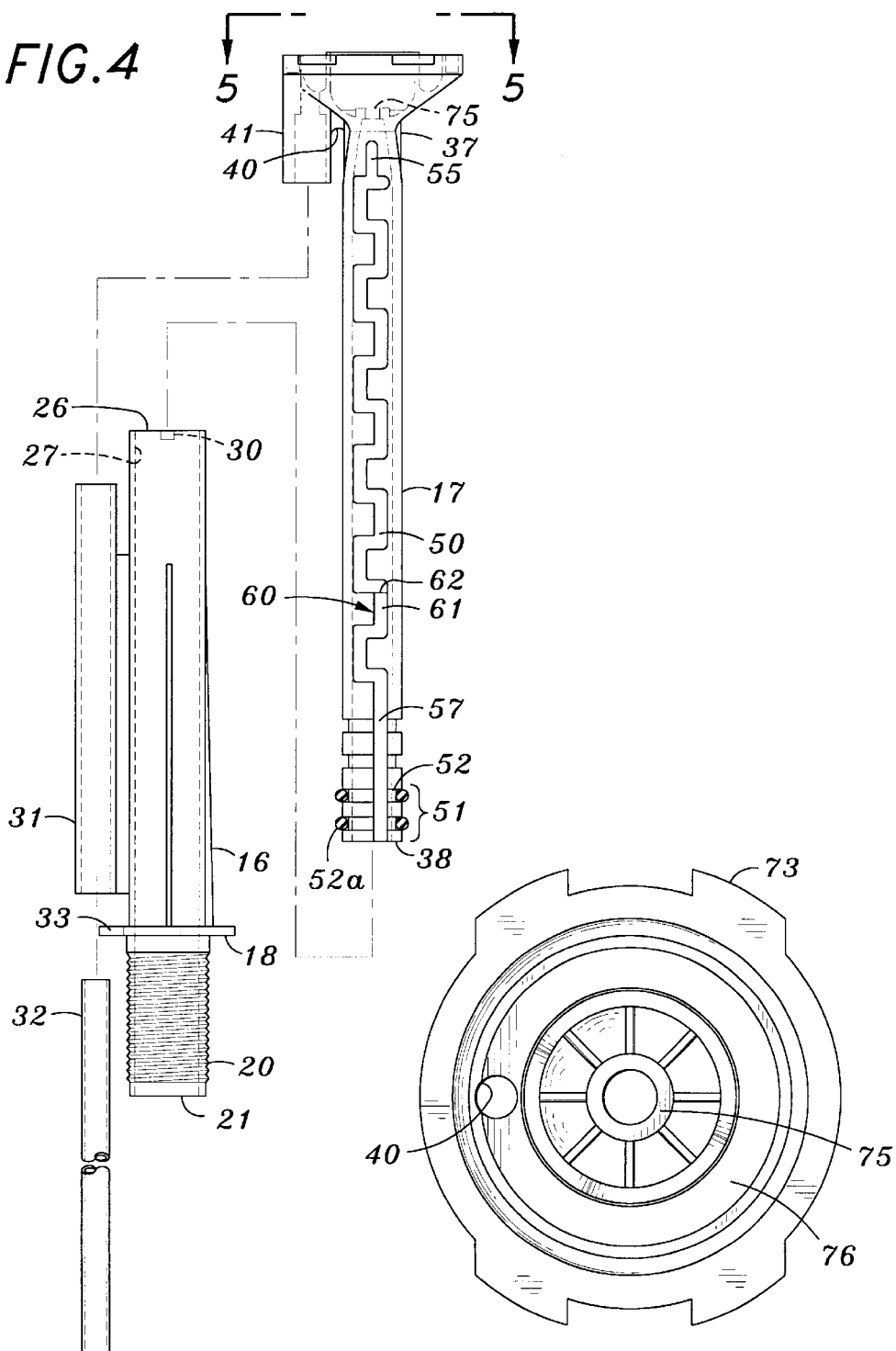

HEIGHT-ADJUSTABLE TANK VALVE

FIELD OF THE INVENTION

A tank valve whose height above its point of attachment is adjustable.

BACKGROUND OF THE INVENTION

With the advent of low flow volume toilet tank installations, the available height for necessary tank valves has expanded greatly, from very short to very long heights. A single-height valve will no longer serve a wide range of installations. While it is an alternative, it is an expensive nuisance to provide valves for each desired height, or to provide parts made specifically for a given height.

Accordingly, efforts have been made to provide height adjustment means so that the height of valves can be adjusted to a number of different elevations. The problems to date have largely resided in the complexity of their height adjustment means. Devices such as collets and other threaded devices are known for the purpose. While these do provide the function, they do it with additional parts, and with parts that sometimes might loosen and let the valve slip and perhaps malfunction.

In addition, parts cost money. In a field such as toilet valves where pennies on the price can make the difference between getting an order or losing it, any device which functions as well or better at a lower cost can represent an important competitive advantage.

It is an object of this invention to provide a height adjustable valve which, except for the use of a two piece telescopic riser, does not require any part not otherwise required in a normal non-adjustable ballcock valve.

It is another object of this invention to provide structure for this purpose in which O-rings can be installed simply and without damage.

BRIEF DESCRIPTION OF THE INVENTION

A tank valve according to this invention includes a telescopic riser having an axis, an outer tube and an inner tube, which are axially slidable relative to one another. Both tubes have a central passage, and an upper end and a lower end. The inner tube has an outer wall which confronts the inner wall of the outer tube.

The outer wall of the inner tube has a continuous groove comprising lateral bar segments that are in planes normal to the central axis, and pass segments which are parallel to the axis. A tongue extends into the passage of the outer tube and engages in the groove. The bar segments and pass segments alternate so the relative axial position of the tubes (and thereby the height of the valve) can be adjusted by moving the tongue axially in the pass segments. The adjusted position will be set when the tongue is in a pass segment. The tubes are rotated relative to one another to enable the tongue to move from one pass segment to the next, and to trap the tongue in a bar segment.

The outer tube includes a guide which receives a stiffly flexible tank fill tube. The tank fill tube is fixed to a tube mount on the inner tube, which is bridged to the passage in the inner tube. The tube mount and guide are axially aligned when the tongue is at the mid-point of a pass segment, so the stiffness of the fill tube assists in resisting relative rotation of the inner and outer tubes.

According to preferred but optional features of this invention, a lead-in groove section is provided adjacent to the lower end of the inner tube which will permit the tongue to be inserted in the groove while leaving a ring groove exposed below the lower end of the outer tube but without a ring in it, then to receive an O-ring, and thereafter to draw the O-ring into the outer tube. After the application of the O-rings, a latch prevents future separation of the tubes.

In another embodiment, the tongue may be a separate part, and the lead-in section can be eliminated.

The above and other features of this invention will be fully understood from the following detailed description and the accompanying drawings, in which:

BRIEF DESCRIPTION OF THE DRAWINGS

FIG. 2 is an exploded view of the valve of FIG. 1;

FIG. 3 is a cross-section taken at line 3–3 in FIG. 2;

FIG. 3A and 3B are fragmentary cross-sections showing two types of tongue.

FIG. 4 is a more detailed exploded view of the valve; and

FIG. 5 is an upper end view of the inner tube.

DETAILED DESCRIPTION OF THE INVENTION

Figure 1:
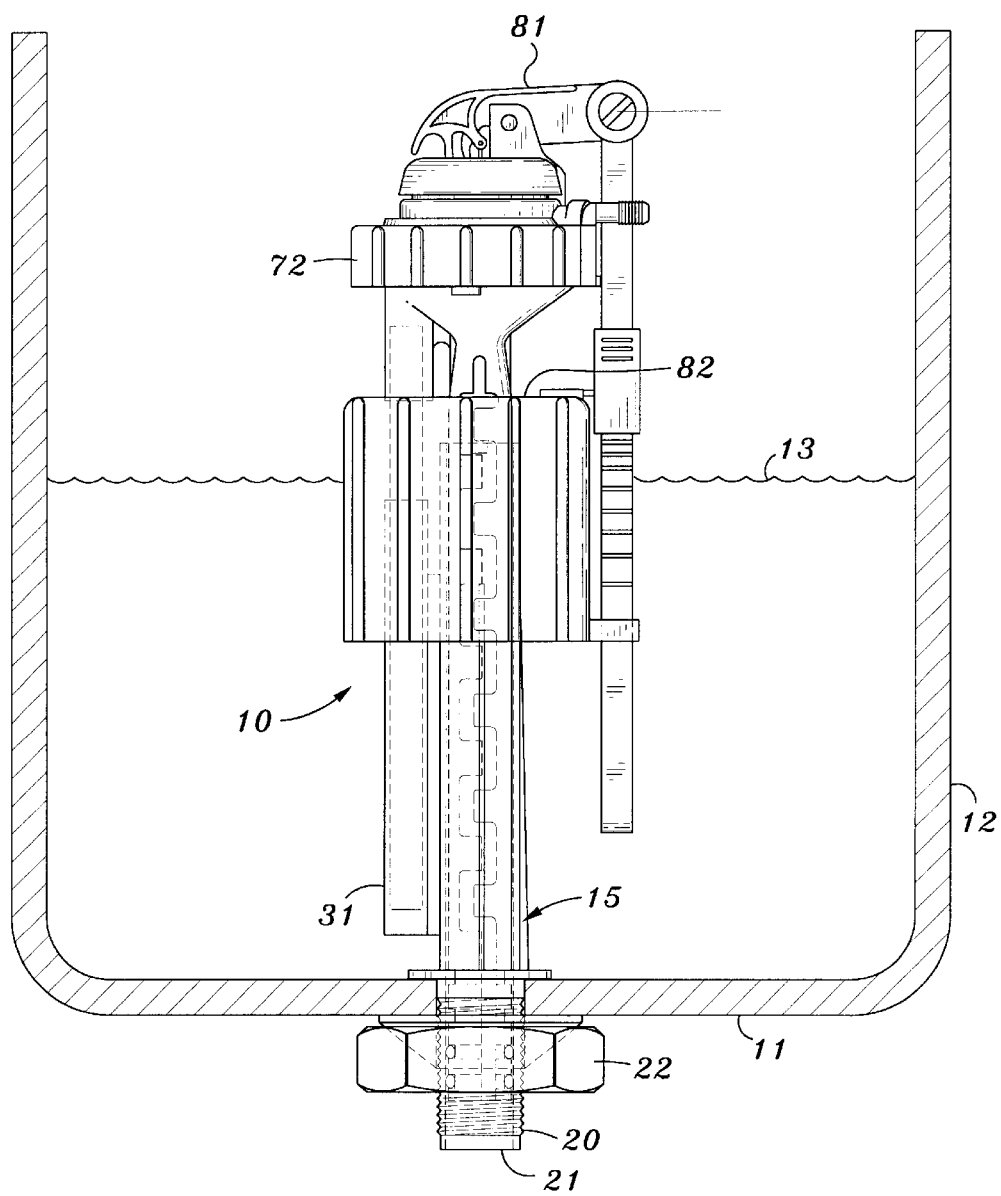
FIG. 1 is a side view partly in cutaway cross-section of a valve according to the invention.

A tank valve 10 (sometimes herein called a "ballcock valve") is shown attached to the bottom 11 of a water tank 12, in which an agreed volume of water is to be maintained. The volume is sensed by its level 13, this being a level-responsive valve.

Valve 10 includes a riser 15 which comprises an outer tube 16 and an inner tube 17. A flange 18 around the outer tube backs up a conventional conical washer 19. A thread 20 adjacent to the lower end 21 of the outer tube passes through a hole in the bottom of the tank to be engaged by a threaded nut 22 to hold the valve in place, attached to the bottom of the tank.

Valve 10 has a central axis 25 which when the valve is in use is usually vertical. The outer tube has an upper end 26 and an internal passage 27. Passage 27 is defined by a circularly cylindrical inner wall 28, extending from upper end 26 to lower end 21 of the outer tube. A tongue 30 (FIG. 3A) is integral with the outer tube. It projects into passage 27 for a purpose to be described.

A tube guide 31 is fixed to the outside of the outer tube. It extends axially along it. Its function is to receive and guide a stiffly flexible tank fill tube 32. A notch 33 is formed in the flange 18 to pass tube 32 while the device is being assembled. The lower end of fill tube 32 will always be inside of the tank after it is installed.

Inner tube 17 has a central axial passage 35 and an outer wall 36 that is circularly cylindrical. Wall 36 extends from the upper end 37 to the lower end 38 of the inner tube. Its diameter is smaller than the diameter of inner wall 28 of the outer tube so the two tubes can be telescopically reciprocated relative to one another.

The riser further includes a bridge 40 into which passage 35 opens. Also, a tube mount 41 has a passage 42 in which the upper end of tank fill tube 32 is fixed. Tube 32 shifts in tube guide 31 when the tubes 16 and 17 are moved axially relative to one another. As will later be shown, when this valve is open to flow, water will flow from the riser, or more particularly from inner tube 17, to passage 42 and tank refill tube 32, into the tank to supply water to it.

A groove 50 (FIG. 4) has a path that extends along the length of the outer wall of the inner tube. Groove 50 primarily includes alternating laterally extending bar segments 51 and pass segments 52. The bar segments extend laterally, and the pass segments extend axially. The function of this groove is to be engaged by the tongue to enable the height (length) of the assembled riser to be adjusted and retained. It will be seen that, because this tongue would project into any ring groove, it could thereby slice any O-ring already placed in the groove. This situation would be intolerable because the valve would leak. The alternative would be to install the tongue after assembly, but this would involve an additional part and assembly labor, both of which are undesirable situations. However, later installing of the tongue is within the scope of this invention, is shown in FIG. 3B.

Reverting now to the lower end of the inner tube, it will be seen from FIG. 1 that when the inner and outer tubes are pressed together to form the shortest possible riser length, a portion 51 of the inner tube projects beyond the lower end 21 of the outer tube. An O-ring groove 52a (or grooves) is formed in this portion, and an O-ring 53 can be applied in this circumstance. Notice that at this time the tongue is far above the rings, very near to the bridge. In fact, to enable portion 51 to protrude even farther, an axial extension segment 55 of the groove, in the nature of a pass segment is provided. It is best aligned with a central portion of the segment.

Additionally, to enable the tongue to reach the groove when the riser is to be assembled, an axial lead-in segment 54 is provided starting at the lower end of the inner tube. This groove will cut across the ring grooves, but this will not affect the sealing properties of an O-ring seated in such a groove. Extension segment 55 and lead-in segment 54 are preferably axially aligned.

Evidently, should an effort be made to separate the inner and outer tubes after the O-ring is installed, the tongue would have to cut through the O-ring, which would destroy the integrity of the valve. Therefore means is provided to prevent their separation once the O-ring has been installed.

This is accomplished by providing a ratchet latch 60 in the lead-in groove. While a valve of this type is quite rigid, minor deflections still can be provided for.

Latch 60 has a ramp surface 61 and a latch surface 62. The ramp surface will enable the tongue to pass over it when the tubes are assembled. A thirty degree ramp will cause the tongue to deform adjacent structure enough to let it pass over the rising ramp surface. However, the reverse is another situation. Then the effect is for the tongue simply to abut the latch surface, and the tubes cannot be separated.

The latch surface will be placed at an axial location where it will stop the separation movement near the intended available setting. The O-ring is applied after the inner and outer tubes are telescoped far enough that the tongue will not pass over it while the tubes are being put together.

As shown in FIG. 3B, a separate tongue 63 can be formed as part of a headed pin 64 passes through a hole through the wall of the outer tube. Then the O-ring can be installed first, and thereafter the tongue can be inserted.

The height of the valve is adjusted by rotating the tubes to align the tongue with a pass surface, moving the inner tube axially, and then rotating it along a bar segment to the next pass segment. When the desired height is reached, the tongue is left in a bar segment, so the tubes cannot be shifted.

Valve workings are contained in a cavity 70 between base 71 and cap 72. Engagement means 73 (FIG. 5) such as are shown in Antunez U.S. Pat. No. 6,244,292, issued Jun. 12, 2001 releasably attaches the cap to the base. This patent is incorporated herein by reference in its entirety for its showing of such means. It will be noticed that a circular seat 75 surrounds the entrance of the inner tube's passage. A circular groove 76 on the outside of the seal communicates with the opening into the tube mount and the tank fill tube.

A differential pressure responsive valve operator 77 of the type shown in Antunez U.S. Pat. No. 6,244,292 controls the position of a flexible disc-like valve seal (not shown). This patent is incorporated herein by reference in its entirety for its showing of such an operation. When this seal sits on seat 75, the valve is closed to flow. When the seal moves away from the seat, the valve is open to flow. This Antunez patent may be referred to for full disclosure of the workings and valve operation.

Control of the position of the seal and seat is accomplished by the well-known constructions designed in the above Antunez patents which are incorporated herein in its entity for its showing of valve structures by reference of this type.

The valve setting is basically determined by the position of a valve pin 80 connected to a first class lever 81 mounted to the cap. A float 82 is connected to linkage 83 attached to the other end of lever 81. For convenience, this float can embrace the riser as shown.

Suffice it to say that when the water level is high enough, the valve pin will be lowered to a position where the differential pressure and differences in valve seal areas will combine to close the valve. When the water level falls, the reverse occurs and the valve opens. These are customary constructions which form no part of the invention and will not be further described. Persons skilled in the art will recognize them.

To summarize, when the valve is to be assembled, the inner tube, without an O-ring, will be inserted in the outer tube, all the way, manipulating them by rotating and passing them together as appropriate. When the inner tube projects far enough beyond the lower end of the outer tube, a ring or rings is applied. The fill tube will have been installed before or at this time. Notch 33 will enable it to be passed through the guide and into the tube mount.

If the construction of FIG. 3B is used, the O-ring can be installed first, and the pin and tongue inserted afterward.

Once this assembly is completed, the riser can be elongated as desired, but it can no longer be extended beyond the limit set by engagement of the tongue and latch surface. It can, however, be readily be adjusted to any height (length) between these extremes.

The foregoing embodiment is preferred, because the outer tube integrally includes the tongue, so there is not a secondary operation to install one. It is the advantage which gives rise to the lead-in segment of the groove in order that the O-ring can be brought into the outer tube without damage from the tongue.

When the tongue of 3B is used, the lead-in segment and extension segment will not be needed, and the inner tube can be shorter, because the O-ring can be applied to it before it is inserted in the upper end of the outer tube. After than, the pin can be inserted and cemented in place, or otherwise permanently retained. This is another available advantage of the embodiment of FIG. 3B.

This invention is not to be limited by the embodiments shown in the drawings and described in the description, which are given by way of example and not of limitation, but only in accordance with the scope of the appended claims.

I claim:

1. A valve for maintaining in a tank an intended volume of water by admitting water to the tank when there is a lesser volume therein, said valve comprising:

a telescopic-style riser comprising:

an outer tube with an upper end and a lower end, said lower end being adapted to be attached to said tank, said outer tube having an axis, an internal passage with an axially-extending interior cylindrical wall with an inside diameter, and a tongue projecting into said internal passage;

an axially extending guide fixed on the outer wall of the outer tube, having an aligning passage therein;

an inner tube having an upper end, a lower end, and an outer wall with an outside diameter, said outside diameter being smaller than said inside diameter, whereby said inside tube is axially reciprocally slidable in said outer tube;

a bridge segment on said inner tube extending laterally relatively to said axis;

a tube mount on said bridge, said tube mount having a mounting opening;

a tank fill tube fixed in said tube mount, and slidably fitted in the aligning passage in said guide, said tank fill tube being open for flow of water into said tank, and stiffly flexible, tending to remain straight and axial when the mounting opening and the guide are axially aligned, but being sufficiently flexible to bend to permit limited rotation between the inner tube and the outer tube;

a groove pattern extending for a substantial axial length in the outer wall of the inner tube, said pattern including alternate bar segments and pass segments, said bar segments lying in respective planes normal to said axis, and said pass segments being substantially parallel to said axis, said bar segments being parallel to and spaced from one another, and said pass segments being parallel to one another but alternately spaced from successive ends of said bar segments, whereby to form a serpentine groove with pass segments alternately disposed at ends of said bar segments, said tongue being inserted into said groove whereby when it is in a pass segment it enables axial movement and prevents rotational movement between said inner tube and outer tube, and when in a bar segment it prevents axial movement and enables rotational movement between them, said tank fill tube, tube mount, and guide being substantially aligned when the tongue is in a bar segment; and.

valve workings carried by said inner tube to control flow of water through said riser and tank fill tube.

2. A valve according to claim 1 in which said inner tube includes in its outer wall a ring groove, and a fluid sealing ring therein adapted to bridge between said inner wall and said outer wall to prevent flow of water between said walls.

3. A valve according to claim 2 in which said inner tube has an axial length sufficient that when said outer tube is moved sufficiently toward said bridge segment, at least one said ring groove projects beyond the lower end of the outer tube, so that a said sealing ring can be applied to said ring groove, and can be brought into the outer tube when the outer tube is moved axially so its upper end moves sufficiently away from said bridge.

4. A valve according to claim 3 in which said tongue is placed in close adjacency to the upper end of said outer tube.

5. A valve according to claim 4 in which an axially extending lead-in segment of groove extends from said lower end of said inner tube aligned with the center of said bar segments and intersects a lower one of said bar segments, whereby said inner tube, without a ring groove can pass said tongue, and said ring groove can be moved beyond the lower end of the outer tube to receive the ring.

6. A valve according to claim 5 in which said lead-in segment includes a sloped latch ramp which will enable the tongue to pass over it when the tongue is in said lead-in segment with the said inner tube is at its maximum permissible extension past the upper end of the outer tube but which engages the tongue to prevent the separation of the tubes beyond the engagements whereby, after assembly of the tubes and sealing ring, the tubes cannot again be separated from one another, said rings being on the opposite side of the latch ramp from the workings.

7. A valve according to claim 6 in which an extension segment of groove extends axially from the uppermost bar segment toward said workings, whereby to permit additional extension of the lower end of the inner tube beyond the lower end of the outer tube.

8. A valve according to claim 6 in which said workings are integral with said inner tube, said workings including a base which incorporates said bridge, a cap detachably attached to said base forming a valving cavity, a differential pressure valve in said cavity having a valve seat and a valve closure, said inlet tube discharging to said valve seat, said base also having a supply outlet to said tube mount and thereby to said tank fill tube, and a level sensor responsive to water level coupled to said differential pressure valve to enable said differential pressure valve to open when water is to be provided to said tank.

9. A valve according to claim 8 in which said level sensor comprises a float.

10. A valve according to claim 9 in which threads are provided on the lower end of said outer tube for mounting the valve to a tank.

11. A valve according to claim 2 in which said tongue is a portion of a separate pin individually attached to said outer tube.

* * * * *